United States Patent [19]
Wittig

[11] Patent Number: 5,447,641
[45] Date of Patent: Sep. 5, 1995

[54] POULTRY WATER CHLORINATOR AND METHOD OF USING SAME

[76] Inventor: John D. Wittig, 12025 Hisers La., Broadway, Va. 22815

[21] Appl. No.: 308,305

[22] Filed: Sep. 19, 1994

[51] Int. Cl.6 .............................................. C02F 1/76
[52] U.S. Cl. .................................. 210/756; 210/198.1; 119/268; 422/37; 422/255; 422/261; 422/263
[58] Field of Search .................... 210/198.1, 753, 754, 210/755, 756; 119/268; 422/37, 261, 263, 255

[56] References Cited

U.S. PATENT DOCUMENTS

| | | |
|---|---|---|
| 4,193,515 | 3/1980 | Purdy . |
| 4,193,516 | 3/1980 | Purdy et al. . |
| 4,347,224 | 8/1982 | Beckert et al. . |
| 4,419,233 | 12/1983 | Baker . |
| 4,617,117 | 10/1986 | Messinger et al. . |
| 4,830,220 | 5/1989 | Finnell . |
| 4,842,729 | 6/1989 | Buchan . |
| 5,143,257 | 9/1992 | Austin et al. . |

OTHER PUBLICATIONS

AQUAWARD® package insert, Eltech International Corporation (1992).
AQUAWARD® DATA SHEET, Eltech International Corporation (no date).
AQUAWARD® Tablets Material Safety Data Sheet, Eltech International Corporation (1991).

*Primary Examiner*—Neil McCarthy
*Attorney, Agent, or Firm*—Popham, Haik, Schnobrich & Kaufman, Ltd.

[57] ABSTRACT

A water distribution system is provided having a flow rate in the range of approximately 10 to 30 psi. A chlorinator is provided in line with the water distribution system to dispense a chlorine compound into the water distribution system. Calcium hypochlorite in solid form is placed into the housing of the chlorinator, the chlorinator being used to dissolve the solid calcium hypochlorite in water, dilute it to a desired concentration, and dispense it into the water distribution system at a flow rate in the range of approximately 50 to 3500 gallons/day. The chlorinator comprises a housing having a closed bottom with a fluid inlet and outlet, an open top, and a removable top cover. A flow rate control valve in the internal passage regulates the rate of flow in the internal passage providing fluid communication between the fluid inlet and the housing interior. A fluid restrictor downstream of the internal passage creates a backflow sufficient to result in fluid flow into the internal passage at flow rates between approximate 50 to 3500 gallons/day. In order to provide the correct concentration of chlorine at flow rates below 1000 gallons/day, the chlorine compound is placed in an insert inserted into the housing interior. The bottom of the insert has two diametrically opposed fluid exchange holes which provide the sole path of fluid communication between the insert interior and the housing interior.

9 Claims, 3 Drawing Sheets

POULTRY WATER CHLORINATOR AND METHOD OF USING SAME

BACKGROUND OF THE INVENTION

1. Field of the Invention

The present invention relates to water chlorinators. More specifically, the invention relates to water chlorinators suitable for use in poultry feeding operations.

2. Related Art

Domestic poultry, particularly chickens and turkeys, required their water to be chlorinated, in order to prevent the growth of bacteria due to contaminants such as feed and droppings. Prior art poultry chlorinators, and particularly those in commercial use, employ liquid chlorine. However, liquid chlorine compounds are particularly corrosive to all metals except stainless steel, thus requiring the use of expensive stainless steel pipes in the chlorinator.

Dry chlorine compounds are more stable than liquid chlorine compounds, and are not as corrosive. Many swimming pool chlorinators use dry chlorine compounds. However, the dry chlorine compounds used for chlorinating swimming pools (e.g., trichloro-S-triazinetrione, also known as "Tri-Chlor"), are not approved for sanitizing drinking water. Dry chlorine compounds suitable for sanitizing drinking water (e.g., calcium hypochlorite) dissolve at different rates than the dry chlorine compounds used for chlorinating swimming pools. Also, dry chlorine compounds suitable for sanitizing drinking water tend to form scale, whereas those used in swimming pools do not.

Also, the concentration of chlorine in swimming pools (approximately 1.0 to 1.5 ppm) may be different from the concentration of chlorine in poultry drinking water (0.5 ppm to 5.0 ppm, depending upon the type of poultry and its age, as well as the preference of the grower). Different chlorine compounds dissolve at different rates to provide different concentrations. The specific type of chlorine compound to be used in a chlorinator therefore affects the design of the chlorinator. Swimming pool chlorinators are not structurally equipped to provide the variation or range in dilution required of poultry chlorinators, nor are they necessarily configured to permit the removal of scale. Therefore, pool chlorinators are not structurally suited for use in connection with a poultry watering system.

Further, most swimming pool chlorinators are configured for water flow at a very high rate (10 to 50 gallons/minute) at low pressure, whereas poultry chlorinators typically provide a very low flow rate of only 50 to 3500 gallons/day. For this reason also, swimming pool chlorinators are not structurally suitable for use in poultry watering systems.

It is the solution of these and other problems to which the present invention is directed.

SUMMARY OF THE INVENTION

It is therefore a primary object of the present invention to provide a poultry chlorinator which can use a dry chlorine compound.

It is another object of the present invention to provide a poultry chlorinator which can provide a wide range of concentrations depending upon the type and age of the poultry.

It is still another object of the present invention to provide a poultry chlorinator which can provide a wide range of flow rates depending upon the type and age of the poultry.

It is still another object of the present invention to provide a poultry chlorinator which is designed to permit the removal of scale.

These and other objects of the present invention are achieved by the modification of existing commercial and residential swimming pool chlorinators, for example the chlorinator disclosed in U.S. Pat. No. 4,617,117, which is incorporated by reference herein in its entirety, in order to accommodate the requirements of a poultry water chlorinator.

In accordance with the present invention, the poultry water chlorinator comprises a generally cylindrical housing having a closed bottom, an open top, and a removable cover closing off the open top. A fluid inlet and a fluid outlet are provided at the housing bottom, and are fluid connected by an intermediate fluid passage. An internal passage provides fluid communication between the fluid inlet and the interior fluid chamber. A flow rate control valve is positioned in the internal passage to regulate the rate of flow between the desired 50 to 3500 gallons/day.

A fluid restrictor is inserted in the intermediate fluid passage downstream of the fluid inlet and the internal passage. The fluid restrictor has an aperture therethrough dimensioned to provide a backflow sufficient to result in fluid flow into the internal passage at flow rates between approximate 50 to 3500 gallons/day. Preferably, this aperture is 5/16 inch in diameter.

An overflow outlet feeder tube provides fluid communication between the fluid outlet and the interior fluid chamber. The feeder tube includes an open upper end offset from the open housing top and an open lower end in axial alignment with the open upper end and in direct fluid communication with the intermediate fluid passage upstream of the outlet.

In order to provide the correct concentration of chlorine at flow rates below 1000 gallons/day, an insert is provided which is dimensioned to be inserted into the interior fluid chamber of the housing. The insert includes a closed bottom, an open top, and an interior chamber. The insert has an outer diameter smaller than the inner diameter of the housing to permit fluid flow around the exterior wall of the insert. The insert top is substantially level with the housing top when the insert is inserted into the interior fluid chamber of the housing, and the insert bottom includes a plurality of fluid exchange holes providing the sole path of fluid communication between the interior fluid chamber of the insert and the interior fluid chamber of the housing.

In one aspect of the invention, there are two diametrically opposite fluid exchange holes in the insert bottom.

In a method of providing chlorinated water to poultry in accordance with the present invention, a water distribution system is provided having a flow pressure rate in the range of approximately 10 to 30 psi. A chlorinator as previously described is provided in line with the water distribution system to dispense a chlorine compound into the water distribution system. Calcium hypochlorite in solid form is placed into the housing of the chlorinator, the chlorinator being used to dissolve the solid calcium hypochlorite in water, dilute it to a desired concentration, and dispense it into the water distribution system at a flow rate in the range of approximately 50 to 3500 gallons/day.

BRIEF DESCRIPTION OF THE DRAWINGS

The invention is better understood by reading the following Detailed Description of the Preferred Embodiments with reference to the accompanying drawing figures, in which like reference numerals refer to like elements throughout, and in which.

DETAILED DESCRIPTION OF THE PREFERRED EMBODIMENTS

Figure 1:
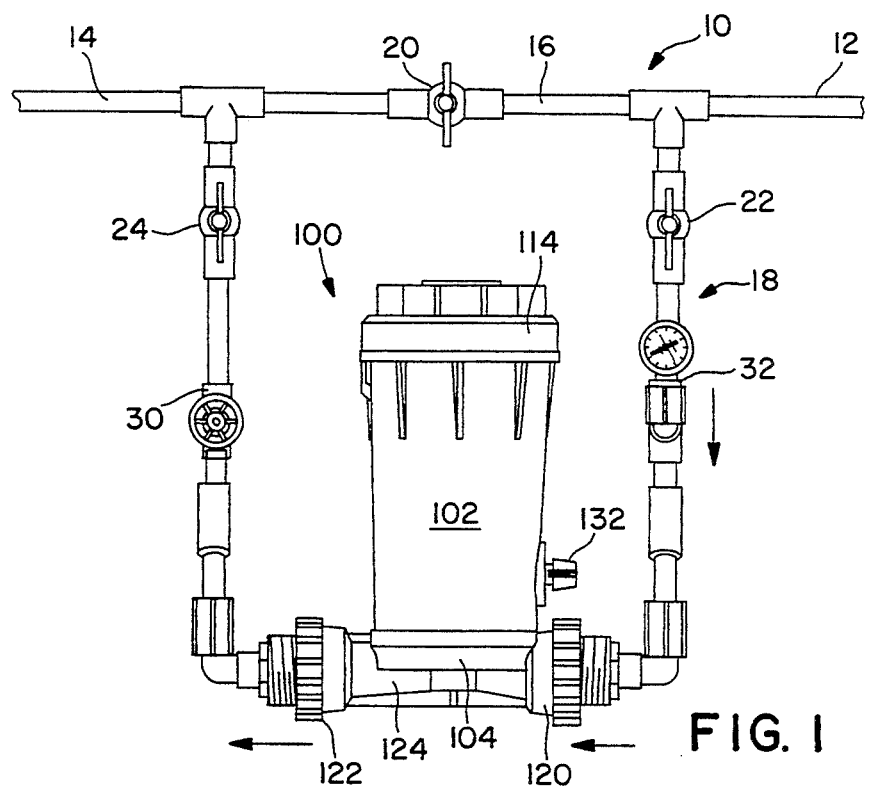
FIG. 1 is a diagrammatic illustration of a poultry water chlorinating system in accordance with the present invention as utilized in a bypass arrangement.
Figure 2:
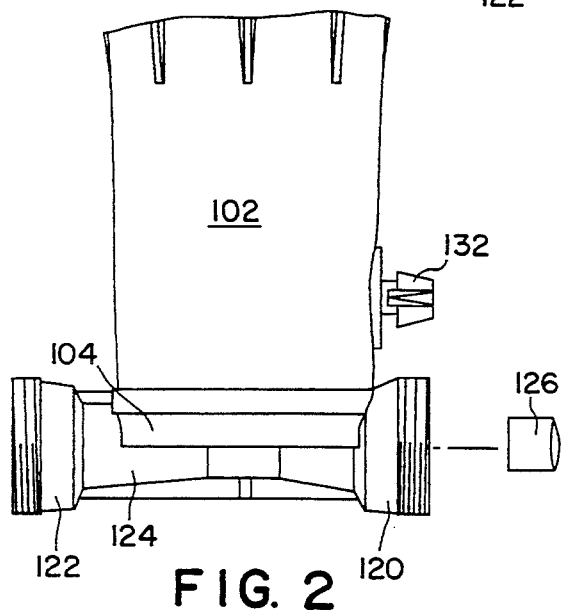
FIG. 2 is a side elevational view of the bottom of the of the poultry water chlorinator of the system of FIG. 1, with the water restrictor shown exploded therefrom.

In describing preferred embodiments of the present invention illustrated in the drawings, specific terminology is employed for the sake of clarity. However, the invention is not intended to be limited to the specific terminology so selected, and it is to be understood that each specific element includes all technical equivalents which operate in a similar manner to accomplish a similar purpose.

Referring now to FIG. 1, there is shown a water distribution system 10 incorporating a chlorinator 100 in accordance with the present invention. Water to the system enters an inlet pipe 12 and can proceed to outlet pipe 14 either through main line 16 or bypass 18. In order to provide maximum resistance to corrosion from chlorine, inlet and outlet pipes 14 and bypass 18 preferably are make of nylon, PVC, or other chlorine-resistant plastic. Preferably, bypass 18 is angled so that the top of chlorinator 100 is clear of main line 16, to provide more ready access to its interior, as described in detail below.

Water is diverted from main line 16 to bypass 18 by closing a main line shutoff valve 20 in main line 16, and by opening bypass shutoff valves 22 and 24 in bypass 18 located upstream and downstream of chlorinator 100. Conversely, water is diverted from bypass 18 to main line 16 by opening main line shutoff valve 20 and by closing bypass shutoff valves 22 and 24. When bypass shutoff valves 22 and 24 are closed, vent valve 30 located between chlorinator 100 and bypass shutoff valve 24 is opened to permit ventilation of chlorine gas formed within chlorinator 100. Water pressure is maintained in the desired range of approximately 10 to 30 psi by a conventional pressure regulator (not shown). The pressure of the water entering chlorinator 100 is measured by a pressure gauge 32 located between bypass shutoff valve 22 and chlorinator 100.

Water distribution system 10 will function in air temperatures between 33° F. and 110° C., and is capable of starting and stopping with water flow rates between 50 and 5000 gallons/day.

Figure 3:
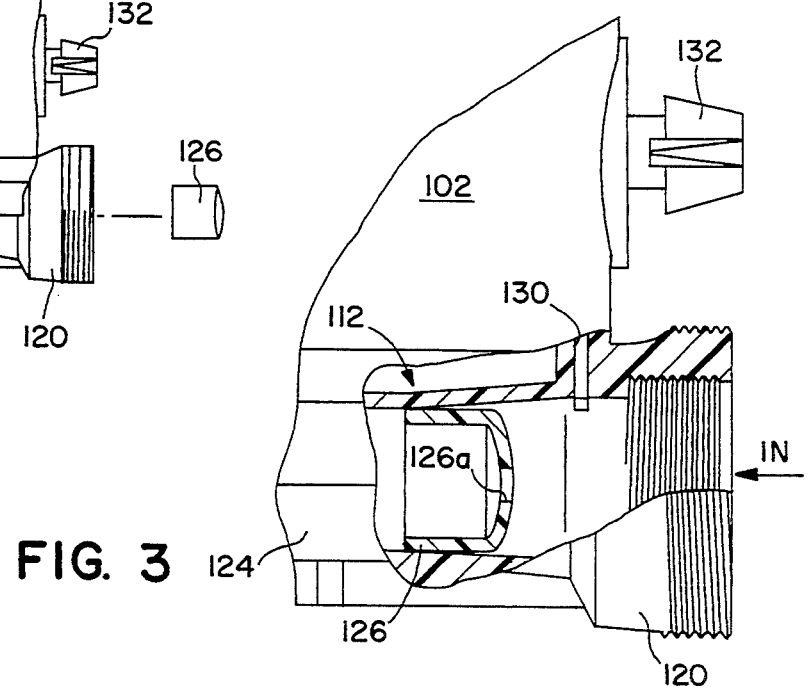
FIG. 3 is a partial cross-sectional view of the fluid inlet of the chlorinator of FIG. 2, with the restrictor in place.
Figure 7:
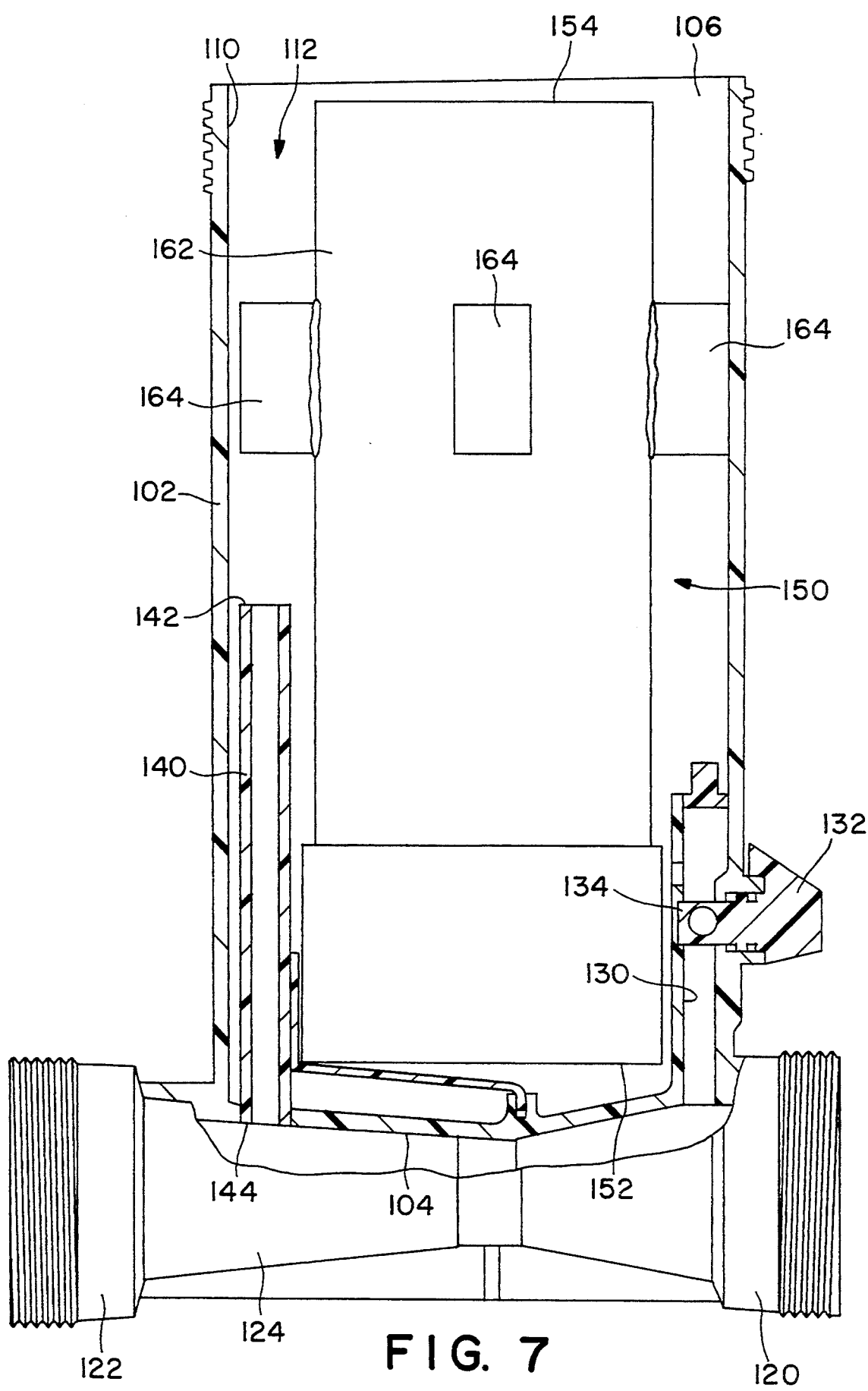
FIG. 7 is a partial, longitudinal cross-sectional view of the chlorinator without its top cover.

As shown in FIGS. 1-4 and 7, chlorinator 100 comprises a generally cylindrical housing 102 having a closed bottom 104, an open top 106 (FIGS. 4 and 7), and an inside wall 110 (FIG. 7) defining a generally cylindrical interior fluid chamber 112 (FIGS. 3 and 7). A removable cover 114 of the type disclosed in U.S. Pat. No. 4,617,117 closes off open top 112, and is in sealing engagement with inside wall 110 through an O-ring seal (not shown).

Diametrically opposed fluid inlet 120 and fluid outlet 122 are provided at bottom 104 and are fluid connected via an intermediate fluid passage 124. In addition, a restrictor 126 (FIGS. 2 and 3) is inserted in fluid passage 124 adjacent fluid inlet 120, for a purpose to be described hereinafter.

An internal passage 130 (FIGS. 3 and 7) provides fluid communication between fluid inlet 120 and interior fluid chamber 112 upstream of restrictor 126. Back pressure due to restrictor 126 causes water to be diverted into internal passage 130 from fluid inlet 120. Restrictor 126 is provided with a small aperture 126a in order to achieve backflow with the relatively low flow rate of 50 to 3500 gallons/day. I have found that an aperture of 5/16 inch provides the desired backflow. Fluid flow through internal passage 130 is regulated by a control knob 132 operatively connected to a valve 134 (FIG. 7), such as a spool, ball, or needle valve, positioned in internal passage 130.

An overflow outlet feeder tube 140 (FIG. 7) is provided diametrically opposite internal passage 130. Feeder tube 140 provides fluid communication between fluid outlet 122 and interior fluid chamber 112. Feeder tube 140 has an open upper end 142 offset from open top 106 of housing 102, and an open lower end 144 in axial alignment with open upper end 142 and in direct fluid communication with intermediate fluid passage 124.

As indicated previously, calcium hypochlorite tends to form scale. After a period of time, this scale can constrict, and even close off a narrow passage such as open lower end 144 of feeder tube 140. Because open lower end 144 is in axial alignment with open upper end 142, a cleaning implement can easily be passed through feeder tube 140 from open upper end 142 to dislodge any build-up of scale at lower end 144.

Water diverted into bypass 18 will fill interior fluid chamber 112 of housing 102 through internal passage 130. A calcium hypochlorite tablet placed in interior fluid chamber 112 will dissolve, the concentration being adjusted by regulating the water flow into interior fluid chamber 112 using control knob 132 to control valve 134.

The calcium hypochlorite tablet preferably used with chlorinator 100 in accordance with the present invention is ⅝ inch thick, 2½ inches in diameter, and weighs 5 ounces. Such tablets are commercially available and are sold as "PPG 3," "Olin Duration Capsules," and "AquaWard." In low flow situations (less than 1000 gallons/day) required for young poultry, the chlorine concentration when the tablet is first added is too high. In order to adjust the chlorine concentration to a level suitable for young poultry, an insert 150 is provided, as illustrated in FIGS. 4-7.

Figure 4:
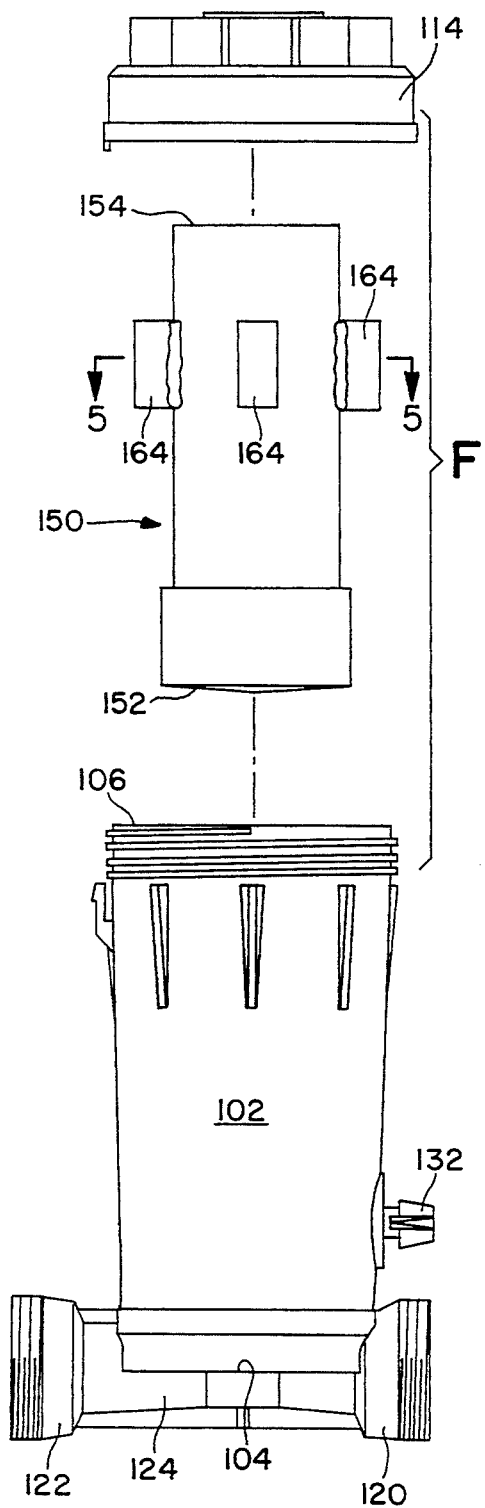
FIG. 4 is an exploded side view of the chlorinator and an insert for the chlorinator.
Figure 5:
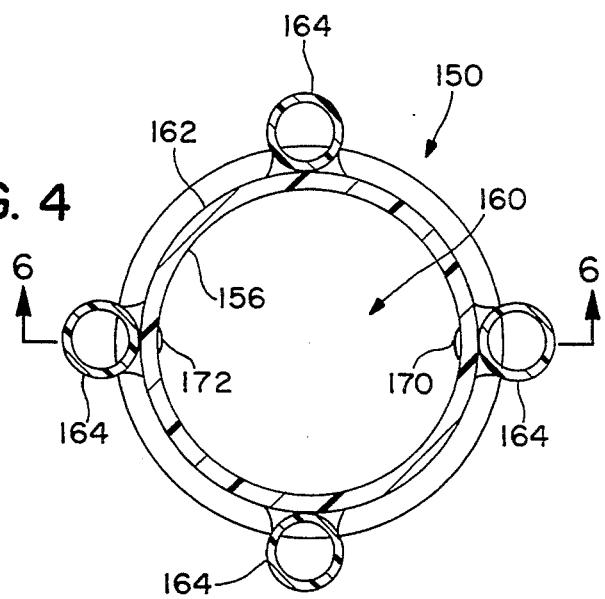
FIG. 5 is a transverse cross-sectional view of the insert shown in FIG. 4.
Figure 6:
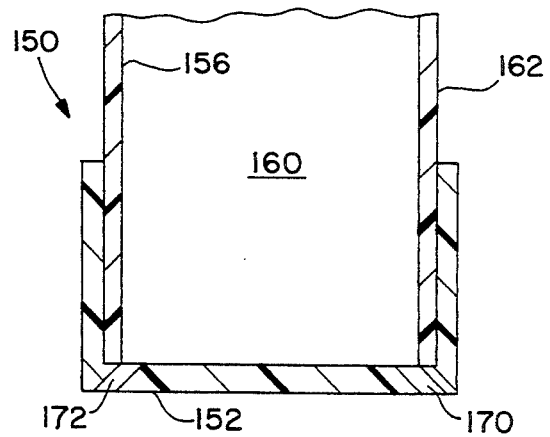
FIG. 6 is a cross-sectional view taken along line 6-6 of FIG. 5.

Insert 150 is generally cylindrical, and includes a closed bottom 152, an open top 154, an inside wall 156 (FIGS. 5 and 6), an interior chamber 160 (FIGS. 5 and 6) defined by bottom 152, top 154, and inside wall 156, and an exterior wall 162. The outer diameter of insert 150 is smaller than the interior diameter of housing 102 to permit fluid flow around insert 150. Insert 150 is maintained in general axial alignment with housing 102 by a plurality of spacers 164 affixed to exterior wall 162. As shown in FIGS. 4 and 5, spacers 164 comprise tubular members spaced circumferentially around insert 150 to permit substantially unimpeded fluid flow. However, as will be appreciated by those of ordinary skill in the art, a ring or projections or other means which also will permit substantially unimpeded fluid flow are also equally suitable as spacers.

Two diametrically opposite fluid exchange holes 170 and 172 (FIGS. 5 and 6) are provided in bottom 152. When insert 150 is placed in interior fluid chamber 112, its top 154 is substantially level with top 106 of housing 102. Thus, water from interior fluid chamber 112 of housing 102 enters and leaves interior chamber 160 only through fluid exchange holes 170 and 172.

When a calcium hypochlorite tablet is placed in interior chamber 160 of insert 150, it will dissolve, resulting in water having a very high concentration of chlorine in interior chamber 160. This high concentration water will exit fluid exchange holes 170 and 172 and intermix with the water flowing between insert 150 and interior wall inside wall 110 of housing 102, resulting in the desired concentration of chlorine.

As the young poultry mature, control knob 132 is adjusted to increase the flow rate. When the flow rate reaches 1000 gallons/day, insert 150 is no longer required, and is removed.

As will be appreciated by those of skill in the art, the principle parts of chlorinator 100, including housing 100 and insert 150, preferably are made of nylon, PVC, or other chlorine-resistant plastic.

Modifications and variations of the above-described embodiments of the present invention are possible, as appreciated by those skilled in the art in light of the above teachings. It is therefore to be understood that, within the scope of the appended claims and their equivalents, the invention may be practiced otherwise than as specifically described.

What is claimed is:

1. A method of providing chlorinated water to poultry, comprising:
   (a) providing a water distribution system having a flow rate in the range of approximately 10 to 30 psi;
   (b) providing a chlorinator in line with the water distribution system for dispensing a chlorine compound into the water distribution system, the chlorinator having a housing for receiving a solid chlorine compound to be dissolved in water and a fluid inlet and a fluid outlet in the housing, an intermediate fluid passage fluid connecting the fluid inlet and outlet, an internal passage providing fluid communication between the fluid inlet, and the interior of the housing and a fluid restrictor positioned in the intermediate fluid passage downstream of the fluid inlet, the fluid restrictor having, an aperture therethrough dimensioned to provide a backflow sufficient to result in fluid flow into the internal passage at a flow rate in the range of approximately 50 to 3500 gallons/day;
   (c) placing calcium hypochlorite in solid form into the housing of the chlorinator; and
   (d) using the chlorinator to dissolve the solid calcium hypochlorite in water, dilute it to a desired concentration, and dispense it into the water distribution system at a flow rate in the range of approximately 50 to 3500 gallons/day.

2. The method of claim 1, further comprising providing an insert dimensioned for insertion within the chlorinator, the insert including fluid exchange holes providing fluid communication between the interior of the insert and the interior of the housing, and placing the insert within the housing; and
   wherein said step (b) comprises placing the calcium hypochlorite in solid form into the insert within the housing.

3. The method of claim 2, further comprising:
   (e) adjusting the flow rate of the chlorinator to below 1000 gallons/day.

4. A poultry water chlorinator comprising:
   a generally cylindrical housing having a closed housing bottom, an open housing top, an inside housing wall, and a housing interior fluid chamber;
   a removable cover closing off said open housing top;
   a fluid inlet and a fluid outlet at said housing bottom;
   an intermediate fluid passage fluid connecting said fluid inlet and outlet;
   an internal passage providing fluid communication between said fluid inlet and said housing interior fluid chamber;
   a fluid restrictor positioned in said intermediate fluid passage downstream of said fluid inlet and said internal passage, said fluid restrictor having an aperture therethrough dimensioned to provide a backflow sufficient to result in fluid flow into said internal passage at flow rates between approximate 50 to 3500 gallons/day;
   a flow rate control valve positioned in said internal passage; and
   an overflow outlet feeder tube providing fluid communication between said fluid outlet and said housing interior fluid chamber, said feeder tube including an open upper end offset from said open housing top and an open lower end in axial alignment with said open upper end and in direct fluid communication with said intermediate fluid passage upstream of said outlet.

5. The chlorinator of claim 4, further comprising an insert dimensioned to be inserted into said housing interior fluid chamber, said insert including a closed insert bottom, an open insert top, an insert inside wall, and an insert interior chamber defined by said insert bottom, said insert top, and said insert inside wall, said insert having an outer diameter smaller than the inner diameter of said housing, said insert top being substantially level with said housing top when said insert is inserted into said housing interior fluid chamber, and said insert bottom including a plurality of fluid exchange holes providing the sole path of fluid communication between said insert interior fluid chamber and said housing fluid interior fluid chamber.

6. The chlorinator of claim 5, wherein there are two diametrically opposite fluid exchange holes in said insert bottom.

7. A poultry water chlorinator comprising:
   a generally cylindrical housing having a closed housing bottom, an open housing top, an inside housing wall, and a housing interior fluid chamber;
   a removable cover closing off said open housing top;
   a fluid inlet and a fluid outlet at said housing bottom;
   an intermediate fluid passage fluid connecting said fluid inlet and outlet;
   an internal passage providing fluid communication between said fluid inlet and said housing interior fluid chamber;
   a fluid restrictor positioned in said intermediate fluid passage downstream of said fluid inlet and said internal passage, said fluid restrictor having an aperture therethrough dimensioned to provide a backflow sufficient to result in fluid flow into said internal passage at flow rates between approximate 50 to 3500 gallons/day;

a flow rate control valve positioned in said internal passage; and an overflow outlet feeder tube providing fluid communication between said fluid outlet and said housing interior fluid chamber, said feeder tube including an open upper end offset from said open housing top and an open lower end in direct fluid communication with said intermediate fluid passage upstream of said outlet.

8. The chlorinator of claim 7, further comprising an insert dimensioned to be inserted into said housing interior fluid chamber, said insert including a closed insert bottom, an open insert top, an insert inside wall, and an insert interior chamber defined by said insert bottom, said insert top, and said insert inside wall, said insert having an outer diameter smaller than the inner diameter of said housing, said insert top being substantially level with said housing top when said insert is inserted into said housing interior fluid chamber, and said insert bottom including a plurality of fluid exchange holes providing the sole path of fluid communication between said insert interior fluid chamber and said housing fluid interior fluid chamber.

9. The chlorinator of claim 8, wherein there are two diametrically opposite fluid exchange holes in said insert bottom.

* * * * *